(12) United States Patent
Tobis et al.

(10) Patent No.: US 9,771,457 B2
(45) Date of Patent: Sep. 26, 2017

(54) PROCESS FOR THE PREPARATION OF A POLYTHIOETHERSULFIDE

(71) Applicant: Akzo Nobel Chemicals International B.V., Arnhem (NL)

(72) Inventors: Jan Tobis, Greiz (DE); Olaf Klobes, Greiz (DE); Günter Sonnenburg, Hohenleuben (DE)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/905,087

(22) PCT Filed: Jul. 30, 2014

(86) PCT No.: PCT/EP2014/066340
§ 371 (c)(1),
(2) Date: Jan. 14, 2016

(87) PCT Pub. No.: WO2015/014876
PCT Pub. Date: Feb. 5, 2015

(65) Prior Publication Data
US 2016/0152775 A1     Jun. 2, 2016

(30) Foreign Application Priority Data
Aug. 2, 2013 (EP) .................................... 13179125

(51) Int. Cl.
C08G 75/12      (2016.01)
C08G 75/14      (2006.01)
C08G 75/16      (2006.01)

(52) U.S. Cl.
CPC ............. *C08G 75/12* (2013.01); *C08G 75/14* (2013.01); *C08G 75/16* (2013.01)

(58) Field of Classification Search
None
See application file for complete search history.

(56) References Cited

U.S. PATENT DOCUMENTS

| 2,392,402 | A |   | 1/1946 | Patrick |
|---|---|---|---|---|
| 2,466,963 | A | * | 4/1949 | Patrick ................... C08G 75/14 156/327 |
| 5,430,192 | A |   | 7/1995 | Hobbs et al. |
| 2003/0050511 | A1 |   | 3/2003 | Gilmore et al. |

FOREIGN PATENT DOCUMENTS

| GB | 1545259 | 5/1979 |
|---|---|---|
| JP | 2013-144756 | 7/2013 |
| WO | 2011/113774 A1 | 9/2011 |
| WO | 2012/139984 A1 | 10/2012 |

OTHER PUBLICATIONS

European Search Report for EP13179125.3, dated Feb. 4, 2014.
International Search Report and Written Opinion for PCT/EP2014/066340, date of mailing Jan. 26, 2015.
International Preliminary Report on Patentability, date of mailing Jul. 13, 2015.
Jorczak, et al, "Polysulfide Liquid Polymers," Industrial and Engineering Chemistry, vol. 43, No. 2, Feb. 1951, pp. 324-328.

* cited by examiner

*Primary Examiner* — Rosalynd Keys
(74) *Attorney, Agent, or Firm* — Sandra B. Weiss

(57) ABSTRACT

Process for the production of a mercapto-terminated liquid polymer with the formula HS—R—(Sy—R)t—SH, wherein each R is independently selected from branched alkanediyl or branched arenediyl groups and groups with the structure —(CH2)p—O—(CH2)q—O—(CH2)r— and wherein 0-20% of the number of R-groups in the polymer are branched alkanediyl or branched arenediyl groups and 80-100% of the number of R-groups in the polymer have the structure —(CH2)p—O—(CH2)r—, wherein t has a value in the range 1-60, y is an average value in the range 1.0-1.5, q is an integer the range 1 to 8, and p and r are integers the range 1-10.

The resulting polymer has an improved ability of recovering its original shape after release from deforming compression forces and improved tendency to recover during the application of those forces.

18 Claims, 1 Drawing Sheet

PROCESS FOR THE PREPARATION OF A POLYTHIOETHERSULFIDE

This application is a national stage filing under 35 U.S.C. §371 of PCT/EP2014/066340, filed Jul. 30, 2014, which claims priority to European Patent Application No. 13179125.3, filed Aug. 2, 2013, the contents of which are each incorporated herein by reference in their entireties.

The present invention relates to a process for the preparation of a polythioethersulfide, i.e. a polymer containing both ether and thioether groups. In particular, the invention includes a process for making a polythioethersulfide by reacting a bis(chloroalkyl)formal with an alkali polysulfide.

Sulfur-containing polymers are valuable intermediates for formulating epoxies, polyurethanes and acrylics, especially for their use in coatings, elastomers, and adhesives, or as sealants.

These polymers preferably have mercapto end-groups, because that allows them to be applied in systems that use oxidative curing methods and makes them more reactive towards epoxies and isocyanates.

In order to improve their ease of handling, mixing, and formulating, the sulfur-containing polymers are preferably liquid at room temperature.

Commercial fuel-resistant sealants, for example, use liquid mercapto-terminated polysulfide polymers prepared by condensation polymerization of bis(chloroethyl)formal and sodium polysulfide. Unfortunately, these polymers have many thermally sensitive S—S linkages, which make sealants derived from these polymers unsuitable for high temperature applications.

Polysulfides with a large number of S—S linkages also suffer from so-called "cold-flow": the reduced ability to recover their original shape after release from deforming compression forces and the tendency to recover during the application of those forces.

The object of the present invention is to provide a process for the preparation of a mercapto-terminated liquid polymer with a reduced number of S—S linkages. This object is achieved by the process according to the present invention.

Another object of the present invention is to provide a process for the preparation of a mercapto-terminated liquid polymer with, in addition to a reduced number of S—S linkages, a high degree of branching. Branching improves the mechanical properties of the polymer.

The invention relates to a process for the production of a mercapto-terminated liquid polymer with the formula $$HS-R-(S_y-R)_t-SH \quad (I)$$

wherein each R is independently selected from:
branched alkanediyl or branched arenediyl groups and groups with the structure $-(CH_2)_p-O-(CH_2)_q-O-(CH_2)_r-$
and wherein 0-20% of the number of R-groups in the polymer are said branched alkanediyl or branched arenediyl groups and 80-100% of the number of R-groups in the polymer have the structure $-(CH_2)_p-O-(CH_2)_q-O-(CH_2)_r-$, wherein t has a value in the range 1-60, y is an average value in the range 1.0-1.5, q is an integer the range 1 to 8, and p and r are integers the range 1-10, said process comprising the following steps:
a) forming a polymer by reacting a bis(haloalkyl)formal with alkali polysulfide of the average formula $M_2S_x$, wherein M is an alkali metal and x is an average value in the range from 1.04 to 1.8,
b) reacting said polymer with a reducing agent in an aqueous reaction mixture, thereby reductively splitting polysulfide linkages, and
lowering the pH of the mixture resulting from step b) to below 6.0 by adding an acid.

In a preferred embodiment, a branching agent is present during step a), which leads to the introduction of branched alkanediyl or branched arenediyl groups in the polymer of structure I. Within this specification, a branched alkanediyl group is a group with the formula $-R^1(-X)_n-$, wherein $R^1$ is a hydrocarbon group, n=1 or 2, and X is a branching point, i.e. a connection to another polythioether chain. A branched arenediyl group differs from a branched alkanediyl group in that $R^1$ is an aromatic group, optionally substituted with alkane groups.

In a more preferred embodiment, the branching agent is present in step a) in an amount of 10-25 mole %, relative to the bis(haloalkyl)formal, which leads to a polymer in which 9-20% of the number of R-groups is a branched alkanediyl or arenediyl group. This is a highly branched polymer, which after cure leads to products with better mechanical properties, e.g. hardness, than lower branched polymers.

Even more preferably, 9-20% of the number of R-groups is a branched alkanediyl group. Most preferably, 9-20% of the number of R-groups is a branched propanediyl group and n=1.

In another embodiment, the polymer has the structure $$HS-(CH_2)_p-O-(CH_2)_q-O-(CH_2)_r-[S_y-(CH_2)_p-O-(CH_2)_q-O-(CH_2)_r]_t-SH$$

The process of the present invention applies three steps. Splitting step b) is essential to make sure that (i) any trisulfide bonds that may be present in the polymer resulting from step a) are removed, (ii) the number of disulfide bonds is reduced, and (iii) any loops, cycles and/or gels that are frequently formed at high branching agent concentrations are split into thiol end-groups. The presence of trisulfide bonds, loops, cycles and gels has a very strong influence on the cold flow and thereby negatively influences the mechanical properties of the polymer.

Thanks to splitting step b), it is possible to produce a highly branched mercapto-terminated liquid polymer suitable for use at high temperatures and with reduced cold flow.

The mercapto-terminated polymer is said to be "liquid", which means that it has a number average molecular weight (determined by GPC with polystyrene standards) in the range 500-20,000 g/mol.

The preferred bis(haloalkyl)formal to be used in the process of the invention preferably has the structure (II):

$$Cl-(CH_2)_p-O-(CH_2)_q-O-(CH_2)_r-Cl \quad (II)$$

wherein p and r are integers, independently chosen from the range 1-10 preferably 1-6, and most preferably 2; q is an integer in the range 1-8, preferably 1-4, and most preferably 1 or 2.

Suitable bis(haloalkyl)formals for use in the process of the present invention are bis(2-dichloroalkyl)formals, bis(2-dibromoalkyl)formals, bis(2-diiodoalkyl)formals. The most preferred bis(haloalkyl)formal is bis(2-dichloroethyl)formal: $Cl-(CH_2)_2-O-CH_2-O-(CH_2)_2-Cl$.

The alkali polysulfide has the formula $M_2S_x$, wherein M is an alkali metal and x is an average value in the range 1.04-1.8, preferably x is at least 1.1. Preferably, x is not higher than 1.5, and most preferably x is not higher than 1.3. This formula is an average formula and x is an average value because alkali polysulfide liquor is a mixture containing sulfide chains of various lengths (mono-, di-, tri-, tetra-, etc. sulfide) in a fast equilibrium.

M is preferably Na or K, most preferably Na.

The value of x in the formula $M_2S_x$ can be determined by a combination of titrations, as described by Dr. E. Dachselt in "*Thioplaste*", VEB Deutscher Verlag für Grundstoffindustrie, Leipzig, 1971, pp. 36-37.

The value of y in formula (I) is an average value in the range 1.0-1.5, preferably 1.01-1.50, more preferably 1.0-1.4, and most preferably 1.1-1.4. The value of y in this formula can be determined by degrading the polymer, e.g. by adding nitric acid followed by heating in a microwave oven, and determining the S-content with ICP-OES (Inductively coupled plasma optical emission spectrometry; ISO01185: 2007).

Reaction in step a) is preferably performed at a pH above 7.5, more preferably above 8, and most preferably above 9 in order to prevent or at least minimize the formation of hydrogen sulfide. The pH can be adjusted to the desired value by the addition of a base. The base can be an organic base or an inorganic base. Examples of inorganic bases are lithium hydroxide, sodium hydroxide, potassium hydroxide, calcium hydroxide, magnesium hydroxide, sodium bicarbonate, sodium carbonate, potassium bicarbonate, potassium carbonate, sodium oxide, magnesium oxide, calcium oxide, calcium carbonate, sodium phenoxide, sodium bisulfide, sodium sulfide, potassium bisulfide, potassium sulfide, barium phenoxide, calcium phenoxide, RONa, RSNa, and mixtures of any two or more thereof; wherein R is a $C_1$-$C_{18}$ alkyl radical.

The base is preferably an alkali metal hydroxide, most preferably sodium hydroxide, due to its availability and low cost.

The molar ratio of alkali polysulfide (calculated as $M_2S_x$), relative to bis(haloalkyl)formal, that is used in step a) is preferably in the range 0.8-2.4, more preferably 0.9-1.8, and most preferably 1.3-1.6.

The process is preferably performed by adding the bis (haloalkyl)formal and the optional branching agent to an aqueous solution of alkali polysulfide. The solution of alkali polysulfide is made from alkali polysulfide liquor, optionally in combination with alkali hydrogen sulfide and alkali hydroxide.

Optionally, a dispersing agent, such as magnesium hydroxide, and/or a wetting agent (e.g. sodium butylnaphthalenesulfonate or a C6-alkylglucoside) may be present in the solution.

The bis(haloalkyl)formal is preferably added slowly, e.g. dropwise, to the alkali polysulfide solution. The temperature of the solution is preferably in the range from 60 to 110° C., more preferably from 70 to 95° C. and most preferably from 75 to 90° C.

Optionally, (additional) alkali hydrogen sulfide or a mixture of alkali hydrogen sulfide and polysulfide liquor is added to ensure that all halogen-containing compounds are converted and a sufficiently high molecular weight is obtained in step a).

This addition of alkali hydrogen sulfide or the mixture of alkali hydrogen sulfide and polysulfide liquor will adjust the overall x-value in the formula $M_2S_x$. The average formula $M_2S_x$ in claim 1, step a), refers to the average formula of the total amount of alkali polysulfide used, thus including any additional alkali polysulfide formation as a result of this optional additional alkali hydrogen sulfide addition.

The branching agent preferably is a trihalide or tetrahalide. Examples of suitable tri- or tetrahalides for use in the process of the present invention are 1,2,3-trichloropropane, 1,2,3-tribromopropane, 1,3-dichloro-2-(chloromethyl)-2-methylpropane, pentaerythritol tetrabromide, tetrabromoethane, 1,3,5-tris(bromomethyl)-2,4,6-triethylbenzene, and 1,2,4,5-tetrakis(bromomethyl)-benzene. The most preferred branching agent is 1,2,3-trichloropropane.

The branching agent is preferably present during step a) in an amount of 0.1 to 25 mol %, relative to the amount of bis(haloalkyl)formal. In a more preferred embodiment, the branching agent is present during step a) in an amount of 10 to 25 mol %, as this leads to a highly branched polymer with good mechanical properties.

The reaction time is preferably 1-5 hours, more preferably 1-4 hours, and most preferably 1-3 hours.

The obtained high-molecular latex is then preferably subjected to several washing steps in order to remove any soluble salts formed as byproducts. In order to obtain a liquid polythioethersulfide, the macromolecules in the polymer need to be reduced to the desired chain length by reductive splitting of polysulfide bonds, i.e. bonds between two or more sulfur atoms (i.e. S—S, S—S—S, etc.). This is the object of step b). The most common and preferred reducing agents are (i) NaSH combined with $Na_2SO_3$ and (ii) sodium dithionite ($Na_2S_2O_4$). Other reducing agents include sodium borohydride, alone or catalyzed by selenol; zinc under acidic conditions; magnesium in methanol; hydrazine; ascorbic acid; tris(2-caboxyethyl)phosphine; dithiothreitol, (2S)-2-amino-1,4-dimercaptobutane; bis(2-mercaptoethyl)sulfone; or N,N'-dimethyl-N,N'-bis(mercaptoacetyl)hydrazine. The most preferred reducing agent in the process according to the invention is sodium dithionite.

The amount of reducing agent to be used depends on the desired molecular weight, as commonly known in the art.

The reductive splitting step is preferably performed at a temperature ranging from 50 to 110° C., more preferably from 65 to 100° C. and most preferably from 75 to 95° C. The reductive splitting step generally takes about 20-300 minutes.

During the reductive splitting, the pH tends to drop, which can be circumvented by adding a base. The pH during this step is preferably kept at a value above 6.5, more preferably above 7.5, and most preferably in the range 7.5-9.5. A preferred base is NaOH. A slight reduction of the pH-value at the end of the reaction increases the yield due to reduced thiolate formation and hence reduced solubility of the polymer and polymer-fragments in the aqueous phase.

The split polysulfide linkages are then converted into terminal mercapto groups in step c) by lowering the pH of the reaction mixture to below 6.0 by adding an acid. Suitable acids include acetic acid, HCl, $H_2SO_4$, formic acid, and $H_3PO_4$. Acetic acid is the most preferred acid.

The resulting polymer has various applications, including the use as binder in sealants, adhesives, and coating compositions, in isocyanate cure, in epoxy-resin cure, and in acrylate resin cure.

FIGURES

EXAMPLES

Example 1

Figure 1:
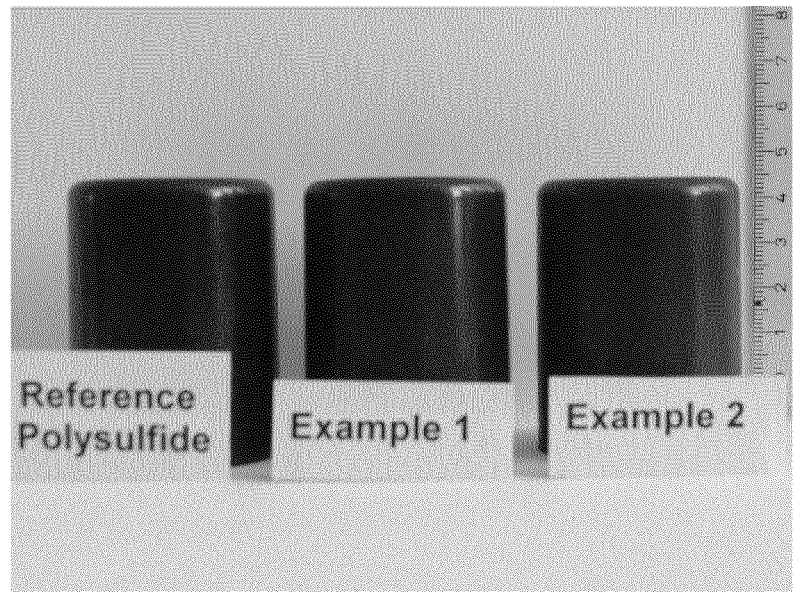
FIG. 1 shows cured samples of a reference polysulfide and of the polymers of Example 1 and 2.

A 1.5-liter round-bottomed flask was fitted with a heating mantle, reflux condenser, thermometer and mechanical stirrer. The flask was charged with 362 ml water, 196 ml of a sodium hydrogen sulfide solution (8.9 mol/l, 1.74 mol) and 87.4 ml sodium polysulfide-liquor (3.29 mol/l, 0.29 mol, sulfur content 2.45). The x-value at this stage was 1.21. Further, 11.9 ml of a 30 wt % solution of C6-alkylglucoside (65 wt % solution in water; AG6206, supplied by AkzoNobel), 1.4 g tetra-butylammonium hydrogensulfate, 18.1 g of a magnesium chloride solution (45 wt % in water) and 155.5 g sodium hydroxide (50 wt % solution in water) were added to the flask.

The suspension was stirred at approximately 350 rpm and heated to 76° C. After reaching 76° C., a solution containing 327.8 g bis(2-chloroethyl)formal (1.81 mol) and 5.3 g 1,2,3-trichloropropane (3.6 mmol) was added dropwise within 1.5 hours. During the addition and the following 4.5 hours, the temperature was kept constant in the range of 76 to 84° C., during which an additional 84 ml of a sodium hydrogen sulfide solution (8.9 mol/L, 0.7 mol) were added, reducing the x-value to 1.15.

The suspension was cooled down to ambient temperature. After sedimentation of the polymer, the mother liquor was decanted off. The polymer was washed with 1 liter of water. The washed polymer was charged to a 1.5-liter round-bottomed flask fitted with a heating mantle, reflux condenser, thermometer and mechanical stirrer. 417 ml water, 40.3 g sodium dithionite (90 wt %), 39.4 ml sodium hydrogen sulfite-solution (41 wt %) and 26.4 g sodium hydroxide (50 wt % solution in water) were added to the stirred (350 rpm) suspension. It was heated to 80±4° C. and was kept at that temperature for 2 hours. The mother liquor was decanted off and the polymer was washed with 1 liter of water. The polymer was suspended in 1 liter of water and acidified with acetic acid to a pH-value of 4.8. The mother liquor was decanted off and the polymer was washed three times with 1 liter of water. The washed polymer was stripped in a rotary evaporator at 85° C. under vacuum to obtain 230 g (yield: 95%) of a pale yellow liquid polymer with a viscosity of 5.3 Pa·s and a number average molecular weight of 2,300 g/mol, determined by GPC (polystyrene standards).

Attenuated total reflectance fourier transformation infrared spectroscopy of the samples was performed between 600 cm$^{-1}$ and 4,000 cm$^{-1}$ with 30 scans. The non-detection of an absorbance in the wavelength region between 3,200 cm$^{-1}$ and 3,700 cm$^{-1}$ confirmed the absence of any hydroxyl-functional end-groups.

In order to determine the number of mercapto-terminal groups of the resulting polymer, the polymer was dissolved in toluene, water was added, and the resulting mixture was titrated with an iodine solution. After that, a starch solution containing mercury(II)-iodine was added and the excess of iodine was back-titrated with a sodium thiosulfate solution.

ICP-OES indicated that the y value of the polymer was 1.3.

Example 2

A 2.5-liter reactor was fitted with a heating mantle, reflux condenser, thermometer and mechanical stirrer. The reactor was charged with 600 ml water, 490 ml of a sodium hydrogen sulfide solution (8.8 mol/liter, 4.3 mol) and 212 ml sodium polysulfide-liquor (3.35 mol/l, 0.7 mol, sulfur content 2.41). The x-value at this stage was 1.2. Further, 37.7 ml of a 30 wt % solution of C6-alkylglucoside in water (AG6206; supplied by AkzoNobel; 65 wt % solution in water), 2.4 g tetra-butylammonium hydrogensulfate, 32.6 g of a magnesium chloride solution (45 wt % in water) and 270 g sodium hydroxide (50 wt % solution in water) were added to the flask.

The suspension was stirred at approximately 350 rpm and heated to 76° C. After reaching 76° C., a solution containing 498 g bis(2-chloroethyl)formal (2.76 mol) and 48 g 1,2,3-trichloropropane (0.3 mmol) was added dropwise within 1.5 hours. During the addition and the following 4.5 hours, the temperature was kept constant in the range of 76 to 84° C., during which an additional 84 ml of a sodium hydrogen sulfide solution (8.9 mol/L) were added.

The resulting highly branched polymer was a rubbery substance which could not be processed to a curable state. A subsequent splitting step was therefore required.

The suspension was cooled down to ambient temperature. After sedimentation of the polymer, the mother liquor was decanted off. The polymer was washed with 1.2 liter of water. The washed polymer was charged to a 2.5-liter reactor fitted with a heating mantle, reflux condenser, thermometer and mechanical stirrer. 750 mL water, 109 g sodium dithionite (90 wt %), 106 ml sodium hydrogen sulfite-solution (41 wt %) and 71 g sodium hydroxide (50 wt % solution in water) were added to the stirred (350 rpm) suspension. It was heated to 80±4° C. and was kept at that temperature for 2 hours. The mother liquor was decanted off and the polymer was washed with 1.2 liter of water. The polymer was suspended in 1.2 liter of water and acidified with acetic acid to a pH-value of 4.8. The mother liquor was decanted off and the polymer was washed three times with 1 liter of water. The washed polymer was stripped in a rotary evaporator at 85° C. under vacuum to obtain 389 g (yield: 89%) of a pale yellow liquid polymer with a viscosity of 3.2 Pa*s and a number average molecular weight of 1,700 g/mol.

ICP-OES indicated that the y value of the polymer was 1.3.

Compression Set Tests

In order to determine the Compression Set of the cured polymers of Examples 1 and 2 and to compare it with the commercial polysulfide polymer with an y-value of 2.0 (Thioplast® G21; ex-AkzoNobel), material was cured using a curing paste having the ingredients listed in Table I. The curing paste was finely grounded on a triple-roll mill and stored at low temperature before use.

TABLE 1

Composition of the curing-paste.

| Component | pbw |
|---|---|
| Manganese(IV)oxide | 100 |
| Benzyl phthalate | 100 |
| Diphenyl guanidine | 6.0 |
| Deaerator (Airex 900) | 7.4 |
| Sodium hydroxide (50 wt. %) | 3.6 |

Polymer was mixed with the paste, poured in a mold, stored at ambient temperature for 30 minutes to enable the release of enclosed air-bubbles, and cured at 60° C. for 18 hours. The amount of curing paste used depended on the thiol content of the polymer.

TABLE 2

Curable compositions

| Sample | Polysulfide G21 | Example 1 | Example 2 |
|---|---|---|---|
| Quantity polymer (g) | 30 | 30 | 30 |
| Quantity curing paste (g) | 6.3 | 6.9 | 15 |
| Water (µL) | 0.5 | 0.5 | 0.5 |

The Compression Set test was performed according to ISO 815. This test determines the ability of elastomeric materials to return to their original thickness after prolonged compressive stresses at a given temperature and deflection. As a rubber material is compressed over time, it loses its ability to return to its original thickness. Compression Set data are expressed as a percentage. The lower the percentage, the better the material resists permanent deformation under a given deflection and temperature range.

In this example, specimen B was used, which was compressed to 25% of its original height, and the compression device was placed in an oven at specified temperatures (23 and 80° C.) for a period of 24 hours. After removing the sample from the oven, the specimen was allowed to cool for 30 minutes before measuring the final thickness.

TABLE 3

Compression sets measurements

| Temperature (° C.) | Polysulfide G21 | Example 1 | Example 2 |
|---|---|---|---|
| | Compression set (%) | | |
| 23 | 68.2 | 9.4 | 8.7 |
| 80 | 96.6 | 94.6 | 92.4 |

Table 3 shows that the compression set of the cured polysulfide polymer G21 is with 68.2% at ambient temperature quite high. This indicates a high level of cold flow. In comparison to that, the compression set of the cured polymers of Examples 1 and 2 depict levels as low as 9.4% and 8.7% at ambient temperature. This clearly shows the beneficial effect of the reduced disulfide-content on the creep-resistance.

To further support the above finding and to depict the phenomenological improvement related to the reduced disulfide-content of the polymer, samples were cured in the same manner as the compression set test specimen. The cured samples were removed from the mold and stored while loaded with 2.6 kg each for 4 hours at 80° C. The relation between the original and the retained height was used as indicator for the pressure-induced flow of the material.

The cured polysulfide G21 sample reduced in height to 71% of the original value, which indicates a considerable extent of flow under pressure. The reduction in height is clearly seen in FIG. 2.

Figure 2:
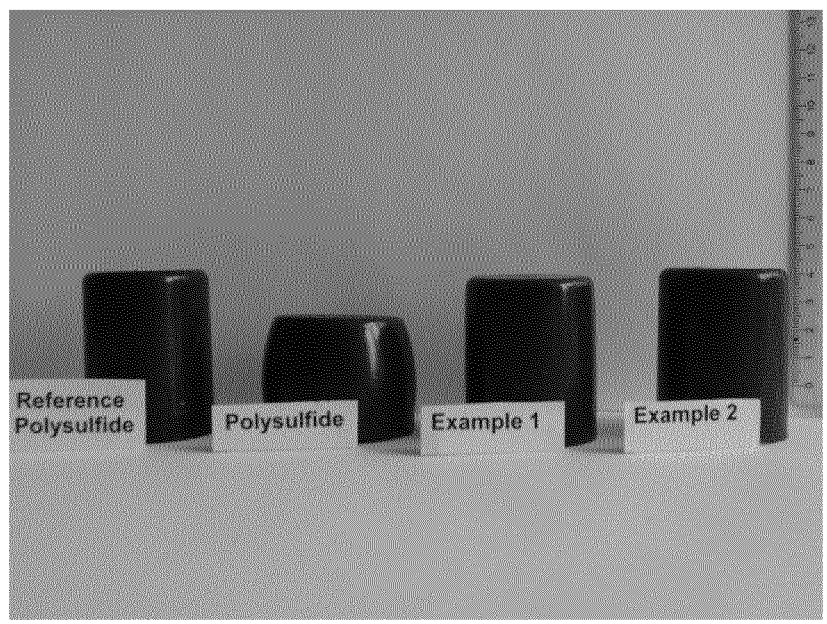
FIG. 2 shows the same samples after annealing at 80° C. under load (2.6 kg) for 4 hours. On the left, the reference polysulfide before annealing, i.e. the sample of FIG. 1, is shown as a comparison.

The polymer of Example 1 retained 95% of its original height, while the polymer of Example 2 retained 99% of its original height (see also FIG. 2). These results clearly indicate a reduced flow of the material and high mechanical strength at high temperature.

The invention claimed is:

1. A process for the production of a mercapto-terminated liquid polymer with the formula $$HS-R-(S_y-R)_t-SH \quad (I)$$

wherein each R is independently selected from:
  branched alkanediyl or branched arenediyl groups of the formula —R$^1$(—X)$_n$—, wherein R$^1$ is a hydrocarbon group, n=1 or 2, and X is a branching point that connects to another polythioether chain, and
  groups with the structure —(CH$_2$)$_p$—O—(CH$_2$)$_q$—O—(CH$_2$)$_r$—
  and wherein 0-20% of the number or R-groups in the polymer are said branched alkanediyl or branched arenediyl groups and 80-100% of the number or R-groups in the polymer have the structure —(CH$_2$)$_p$—O—(CH$_2$)$_q$—O—(CH$_2$)$_r$—, wherein t has a value in the range 1-60, y is an average value in the range 1.0-1.5, q is an integer the range 1 to 8, and p and r are integers the range 1-10,
said process comprising the following steps:
  a) forming a polymer by reacting a bis(haloalkyl) formal with alkali polysulfide of the average formula M$_2$S$_x$, wherein M is an alkali metal and x is an average value in the range from 1.04 to 1.8, optionally in the presence of an amount of branching agent of the formula —R$^1$(—X)$_n$—, wherein R$^1$ is a hydrocarbon group, n =1 or 2, and X is a branching point that connects to another polythioether chain,
  b) reacting said polymer with a reducing agent in an aqueous reaction mixture, thereby reductively splitting polysulfide linkages, and
  c) lowering the pH of the mixture resulting from step b) to below 6.0 by adding an acid.

2. The process according to claim 1 wherein the polymer has the structure $$HS-(CH_2)_p-O-(CH_2)_q-O-(CH_2)_r-[S_y-(CH_2)_p-O-(CH_2)_q-O-(CH_2)_r]_t-SH$$

wherein p, q, r, y, and t have the same meaning as in claim 1.

3. The process according to claim 1 wherein 9-20% of the number of R-groups in the polymer are branched alkanediyl or branched arenediyl groups and 80-91% of the number or R-groups in the polymer have the structure —(CH$_2$)$_p$—O—(CH$_2$)$_q$—O—(CH$_2$)$_r$—.

4. The process according to claim 1 wherein the bis (haloalkyl)formal has the structure (II):

$$Cl-(CH_2)_p-O-(CH_2)_q-O-(CH_2)_r-Cl \quad (II)$$

wherein p and r are integers, independently chosen from the range 1-10 and q is an integer in the range 1-8.

5. The process according to claim 1 wherein q is in the range 1-4.

6. The process according to claim 4 wherein the bis (haloalkyl)formal is bis(2-dichloroethyl)formal.

7. The process according to claim 1 wherein y is in the range from 1.01 to 1.50.

8. The process according to claim 1 wherein the reducing agent is Na$_2$S$_2$O$_4$ or a mixture comprising NaSH and Na$_2$SO$_3$.

9. The process according to claim 1 wherein the alkali polysulfide is sodium polysulfide and wherein the molar ratio of sodium polysulfide (calculated as Na$_2$S$_x$), relative to bis(haloalkyl)formal, is in the range 0.8-2.4.

10. The process according to claim 1 wherein said branching agent is present in step a).

11. The process according to claim 10 wherein the branching agent is a trihalide or a tetrahalide.

12. The process according to claim 11 wherein the branching agent is selected from 1,2,3-trichloropropane, 1,2,3-tribromopropane, 1,3-dichloro-2-(chloromethyl)-2-methyl-propane, pentaerythritol tetrabromide, tetrabromoethane, 1,3,5-tris(bromomethyl)-2,4,6-triethylbenzene, and 1,2,4,5-tetrakis(bromomethyl)-benzene.

13. The process according to claim 12 wherein the branching agent is 1,2,3-trichloropropane.

14. The process according to claim 10 wherein the branching agent is present in an amount of 0.1 to 25 mol %, relative to the amount of bis(haloalkyl)formal.

15. The process according to claim 14 wherein the branching agent is present in an amount of 10 to 25 mol %, relative to the amount of bis(haloalkyl)formal.

16. The process according to claim 4, wherein p and r are integers, independently chosen from the range 1-6.

17. The process according to claim 16, wherein p and r are each equal to 2.

18. The process according to claim 5 wherein q is equal to 1 or 2.

* * * * *

UNITED STATES PATENT AND TRADEMARK OFFICE
CERTIFICATE OF CORRECTION

| | | Page 1 of 1 |
|---|---|---|
| PATENT NO. | : 9,771,457 B2 | |
| APPLICATION NO. | : 14/905087 | |
| DATED | : September 26, 2017 | |
| INVENTOR(S) | : Jan Tobis et al. | |

It is certified that error appears in the above-identified patent and that said Letters Patent is hereby corrected as shown below:

In the Claims

Claim 1, Column 7, Line 63:
Delete "or"
And Insert --of--

Claim 1, Column 7, Line 65:
Delete "or"
And Insert --of--

Claim 3, Column 8, Line 26:
Delete "number or"
And Insert --number of--

Signed and Sealed this
Seventh Day of November, 2017

Joseph Matal
*Performing the Functions and Duties of the
Under Secretary of Commerce for Intellectual Property and
Director of the United States Patent and Trademark Office*